United States Patent Office
3,755,604
Patented Aug. 28, 1973

3,755,604
SEBUM INHIBITORS
Duane Gordon Gallo, Evansville, Ind., assignor to
Mead Johnson & Company, Evansville, Ind.
No Drawing. Filed Dec. 14, 1970, Ser. No. 98,192
Int. Cl. A61k 27/00
U.S. Cl. 424—317                  5 Claims

ABSTRACT OF THE DISCLOSURE

A process is disclosed for inhibition of sebum production by sebaceous cells. This process is carried out by contacting the sebaceous cell with a pentadienoic acid such as 3-methyl-5-phenyl-2-trans-4-trans-pentadienoic acid or 2-alkyl-3-methyl-5-phenyl-2-trans-4-trans-pentadienoic acids.

BACKGROUND OF THE INVENTION

Sebum, which is also referred to as skin lipid, is a substance produced by sebaceous glands. As man approaches puberty, there is a resulting increase in sebaceous glandular activity resulting in an increased production of sebum. This increase of sebum is considered to be the underlying cause of the high incidence of acne vulgaris noted at the onset of puberty.

Methods which heretofore have been used to control the quantity of sebum produced by the sebaceous gland include suppression of sebum production by treatment with an estrogen. Exfoliative X-ray treatment which produces a shrinkage of sebaceous glands with a corresponding decrease in sebum production has also been used. While estrogen and exfoliative X-ray treatment are effective measures in causing a decrease in the amount of sebum produced by the sebaceous glands, they represent heroic measures which are not altogether acceptable for routine treatment because of undesirable and sometimes dangerous side effects.

Another method for reducing sebum production has been reported by J. S. Strauss et al., J. Ivest. Derm., 48, 492 (1967). This method comprises administration of eicosa-5:8:11:14-tetraynoic acid to acne patients with a resulting decrease in sebaceous cellular activity and concomitant improvement of the acne lesions.

SUMMARY OF THE INVENTION

This invention is concerned with a process for reducing sebum production. In particular, this invention deals with a pharmaceutical process for inhibiting sebum production by contacting the sebaceous cell with 2-trans-4-trans-pentadienoic acid characterized by Formula I and non-toxic pharmaceutically acceptable metal salts thereof.

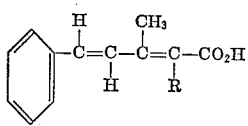

Formula I

Pentadienoic acids of Formula I which are the active ingredients used in the process of the present invention for the inhibition of sebum production are obtained according to methods disclosed by R. H. Wiley et al., [J. Chem. Soc., 3831 (1958) and J. Org. Chem., 29, 2986 (1964)]. Illustrative of pentadienoic acids particularly useful in inhibiting sebum production are 3-methyl-5-phenyl-2-trans-4-trans-pentadienoic acid,
2,3-dimethyl-5-phenyl-2-trans-4-trans-pentadienoic acid,
2-ethyl-3-methyl-2-trans-4-trans-pentadienoic acid,
2-n-propyl-3-methyl-2-trans-4-trans-pentadienoic acid,
2-isopropyl-3-methyl-2-trans-4-trans-pentadienoic acid.

Preferred compounds for use in the present invention are 3-methyl-5-phenyl-2-trans-4-trans-pentadienoic acid and 2,3-dimethyl-5-phenyl-2-trans-4-trans-pentadienoic acid.

In Formula I, R represents hydrogen, or a lower alkyl group of from 1 to 3 carbon atoms. It is to be understood that the term "lower alkyl" as employed herein comprehends both straight and branched chain hydrocarbon radicals such as methyl, ethyl, propyl and isopropyl.

The pharmaceutically acceptable metal salts contain as a cationic component metals which themselves make no deleterious contribution to the acceptability of the salts for topical use. Such salts are substantially free of dermal irritation and sensitizing propensity and systemic toxicity when applied topically. These salts include sodium, potassium, calcium, magnesium, zinc and aluminum salts.

Preparation of the metal salts of the substances of Formula I is carried out by methods which are well known to the art. For example, admixture of a pentadienoic acid of Formula I with one chemical equivalent of sodium hydroxide provides the corresponding sodium salt of the pentadienoic acid.

In the present invention, the process for reducing sebum production is carried out by topical application of an effective amount of a 2-trans-4-trans-pentadienoic acid or a pharmaceutically acceptable metal salt thereof directly to the area to be treated and maintaining contact therewith. Substances of Formula I may be applied without or with convenient topical pharmaceutical or cosmetic carriers such as a jelly, ointment, cream, lotion, solution, suspension, cleansing composition, dusting powder or aerosol. The composition is applied in such a way that the pentadienoic acid remains in intimate contact with the skin. The concentration of the active ingredient in the composition is not particularly critical and they are generally employed in the range of about 2% to 25% by weight. Metal salts of pentadienoic acids may also be administered intradermally in aqueous solution and produce a rapid decrease in sebum production by the sebaceous gland.

The utility of pentadienoic acids of Formula I in reducing sebum production can be demonstrated in an assay involving the preputial gland of the male rat. The preputial gland is an organized collection of sebaceous cells and as such is useful in determining the effect of inhibitors of sebum production. In the normal course of metabolic events, the sebaceous cell can utilize acetate or glucose as substrates in the synthesis of sebum. A measure of activity of the sebaceous cells can be obtained by determining the amount of acetate or glucose incorporated into sebum. By employing radioactive acetate-$C^{14}$ or glucose-$C^{14}$ substrates, the incorporation of acetate into sebum can be measured. Thus, when an inhibitor of sebum production is administered along with the radioactive substrate, the amount of radioactive substrate incorporated into the sebum would be less than that of a control wherein the inhibitor is not administered.

The preputial gland assay clearly demonstrates that pentadienoic acids of Formula I are effective inhibitors of sebum synthesis. For example, at a molar concentration of $1 \times 10^{-3}$, 3-methyl-5-phenyl-2-trans-4-trans-pentadienoic acid and 2,3-dimethyl-5-phenyl-2-trans-4-trans-pentadienoic acid provide a 72% and 70% inhibition of sebum synthesis respectively.

Directions are hereinafter provided for the preparation of representative pharmaceutical compositions useful in practicing the present invention. Examples are also given illustrating the use of the process of the present invention for decreasing sebaceous cell sebum production. These detailed examples are given in order to illustrate the invention and are not to be construed as limiting the scope thereof.

EXAMPLES OF SPECIFIC EMBODIMENTS

Example 1.—Twenty percent 3-methyl-5-phenyl-2-trans-4-trans-pentadienoic acid aerosol foam A solution is prepared from the following ingredients in the amounts specified.

Compounds: Weights
- 3-methyl-5-phenyl-2-trans-4-trans - pentadienoic acid ___g__ 20
- Ethanol ___g__ 50
- Sodium hydroxide q.s. to pH 7.5 (sp. gr. 1.1).
- Polyoxyethylene[2]steroyl ether [1] ___percent__ 2
- Distilled water q.s. ___ml__ 90

[1] Brij® 72 (Atlas Co.).

A portion of this solution is filled into an aerosol container of a desired size and charged with the following propellants in an amount proportional to the weight of the aerosol composition.

Compounds: Weights, g.
- Dichlorodifluoromethane ___ 5
- 1,2,-dichloro-1,1,2,2-tetrafluoroethane ___ 5

Example 2.—Ten percent 3-methyl-5-phenyl-2-trans-4-trans-pentadienoic acid jelly A jelly-like washable base containing 10% 3-methyl-5-phenyl-2-trans-4-trans-pentadienoic acid suitable for topical use is prepared from the following ingredients which are sufficient for the preparation of a 1 kilogram batch of the jelly.

Compounds: Weights or volumes, g.
- 3-methyl-5-phenyl-2-trans - 4 -trans - pentadienoic acid ___ 100.0
- Carboxyvinylpolymer, TGA specification No. 81 exception solution viscosity (0.5% NH$_2$O) 4,000–11,000 cps. ___ 25.0
- Sodium hydroxide q.s. to pH 7.5.
- Methyl paraben ___ 1.2
- Propyl paraben ___ 0.3
- Glycerine ___ 50.0
- Distilled water q.s. ___ 1,000.0

Distilled water (ca. 750 ml.) is placed in a vessel equipped for heating and stirring and warmed to 60° C. Glycerine, methyl paraben and propyl paraben are dissolved in the water and the solution allowed to cool to 25° C. Micronized 3-methyl-5-phenyl - 2 - trans-4-trans-pentadienoic acid is then added. This dispersion is rapidly stirred and the carboxyvinylpolymer is added directly into the vortex of the stirred solution. The speed of the stirrer is then reduced to avoid the entrapment of gas bubbles and gentle stirring is maintained while the mixture is adjusted to a pH of 7.5 by the addition of 10 M aqueous sodium hydroxide and then diluted with sufficient water to provide a total weight of 1000 g. of gel. When the gel becomes smooth and homogeneous, it is filled into suitable containers such as collapsible metal tubes or small jars. This preparation is suitable for use for application to the skin or it may be modified by the addition of perfume and dyes in order to obtain desired pharmaceutical or cosmetic appeal.

By substituting the appropriate pentadienoic acid for 3-methyl-5-phenyl-2-trans-4-trans-pentadienoic acid, other 10% jelly compositions are prepared which contain 2,3-dimethyl-5-phenyl - 2 - trans - 4 - trans-pentadienoic acid, 2-ethyl-3-methyl-2-trans-4-trans-pentadienoic acid, 2-n-propyl-3-methyl-2-trans-4-transpentadienoic acid.

Example 3.—Ten percent 3-methyl-5-phenyl-2-trans-4-trans-pentadienoic acid lotion A solution of the following materials is prepared. If desired, thickeners and perfumes may be added to obtain desired cosmetic characteristics.

- Ethanol ___ml__ 70
- Propylene glycol ___g__ 2
- 3-methyl-5-phenyl-2-trans-4-pentadienoic acid ___g__ 10
- Distilled water q.s. ___ml__ 100
- Sodium hydroxide q.s. to pH 7.5.

Example 4.—Inhibition of sebum synthesis by the preputial gland in vitro

The preputial gland of the rat is an organized collection of modified sebaceous cells which is convenient for the study of lipid synthesis. The preputial gland is readily obtained from rats and actively utilizes acetate-$C^{14}$ in the synthesis of sebum under in vitro conditions.

Preputial glands are excised from rats and cut longitudinally into two pieces. Four pieces, one from each of four rats, are incubated together for 4 hours at 37° C. in a buffered medium containing glucose, penicillin, streptomycin, acetate-$C^{14}$ and the compound under investigation. The antibiotics are included to prevent bacterial growth and the acetate-$C^{14}$ serves as substrate. Following the incubation period, the tissue lipids are extracted and radioactivity of the extracts is determined as a measure of lipid synthesis. The results obtained with 3-methyl-5-phenyl-2-trans-4-trans-pentadienoic acid and 2,3-dimethyl-5-phenyl-2-trans-4-trans-pentadienoic acid compared to a control which does not contain the pentadienoic acid are shown in Table I. The reduction in lipid synthesis observed at the indicated concentrations of each test compound is statistically significant.

TABLE I.—EFFECT OF 2-TRANS-4-TRANS-PENTADIENOIC ACIDS ON SEBUM SYNTHESIS BY THE RAT PREPUTIAL GLAND

| | Millimicromoles Acetate-$C^{14}$ Incorporated/g. of fat-free tissue | Percent inhibition* |
|---|---|---|
| 3-methyl-5-phenyl-2-trans-4-trans-pentadienoic acid: | | |
| $1 \times 10^{-4}$ molar | 2,199±218 | 49 |
| $1 \times 10^{-3}$ molar | 766±76 | 72 |
| $1 \times 10^{-2}$ molar | 46±1 | 99 |
| Control equals | 4,321±408 | |
| 2,3-Dimethyl-5-phenyl-2-trans-4-trans-pentadienoic acid: | | |
| $1 \times 10^{-4}$ molar | 2,410±277 | 31 |
| $1 \times 10^{-3}$ molar | 1,064±66 | 70 |
| $1 \times 10^{-2}$ molar | 101±6 | 97 |
| Control equals | 3,512±337 | |

*100 (1-test compound/control).

Example 5.—Inhibition of skin lipid (sebum) synthesis by intradermal injection of 3-methyl-5-phenyl-2-trans-4-trans-pentadienoic acid in the Intact Rat An aqueous solution containing $5 \times 10^{-3}$ molar 3-methyl-5-phenyl-2-trans-4-trans-pentadienoic acid sodium salt is adjusted to a pH of 7.5. About 10 microcurie of sodium acetate-$C^{14}$ or glucose-$C^{14}$ is added to the sodium salt solution of 3-methyl-5-phenyl-2-trans-4-trans-pentadienoic acid and to a corresponding control solution which is also adjusted to a pH of 7.5. A volume of 0.1 ml. of the solution is injected intradermally into four different areas of the rat. One hour later the rat is sacrificed and appropriate areas of the skin excised for analysis of lipid-$C^{14}$ content.

The results obtained for acetate-$C^{14}$ and glucose-$C^{14}$ substrates are given in the following table.

TABLE II.—EFFECT OF 3-METHYL-5-PHENYL-2-TRANS-4-TRANS-PENTADIENOIC ACID OF THE SYNTHESIS OF LIPIDS BY THE SKIN OF INTACT RATS

| | Counts per minute per 100 mg. skin | Percent inhibition* |
|---|---|---|
| Acetate-$C^{14}$ | 888±138 | 46 |
| Control | 1,650±250 | |
| Glucose-$C^{14}$ | 825±75 | 39 |
| Control | 1,338±75 | |

*100 (1-test compound/control).

While several specific embodiments are disclosed in the foregoing specification, it will be appreciated that

What is claimed is:

1. The process for reducing sebaceous cell sebum production in a mammal in need thereof which comprises contacting said sebaceous cell in the skin of said mammal with an amount effective to reduce sebum production thereby of a 2-trans-4-trans-pentadienoic acid selected from the group consisting of those having the formula

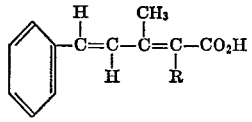

wherein R is hydrogen or lower alkyl of from 1 to 3 carbon atoms inclusive and the non-toxic pharmaceutically acceptable metal satls thereof.

2. The process of claim 1 wherein the pentadienoic acid compound is 3-methyl-5-phenyl-2-trans-4-trans-pentadienoic acid.

3. The process of claim 1 wherein the pentadienoic acid compound is 3-methyl-5-phenyl-2-trans-4-trans-pentadienoic acid sodium salt.

4. The process of claim 1 wherein the pentadienoic acid compound is 2,3-dimethyl-5-phenyl-2-trans-4-trans-pentadienoic acid.

5. The process of claim 1 wherein the pentadienoic acid compound is 2,3-dimethyl-5-phenyl-2-trans-4-trans-pentadienoic acid sodium salt.

References Cited

Pattendon et al.: J., Chem. Soc. C, 1968, (16), 1997–2006.
Wiley, J. Chem. Soc. 1958, 3831–3838.
Chemical Abstracts: 44:583(e) 1950.
Chemical Abstracts: 45:1546(d) 1951.
Chemical Abstracts: 55:1534(i) 1955.
Chemical Abstracts: 61:13168(f) 1964.
Chemical Abstracts: 61:13355(b) 1964.
Chemical Abstracts: 64:14125(c) 1966.

ALBERT T. MEYERS, Primary Examiner

N. A. DREZIN, Assistant Examiner

U.S. Cl. X.R.

424—47, 289